United States Patent

Ravetto

Patent Number: 5,842,319
Date of Patent: Dec. 1, 1998

[54] INVISIBLE DECKING CONNECTOR

[76] Inventor: George D. Ravetto, 500 Echo Creek Rd., Big Fork, Mont. 59911

[21] Appl. No.: 851,246

[22] Filed: May 5, 1997

[51] Int. Cl.$^6$ ....................................................... E04B 5/12
[52] U.S. Cl. ............................ 52/715; 52/698; 411/458; 411/460; 411/356; 411/358; 411/455; 411/446
[58] Field of Search ................................ 52/698, 650.3, 52/715; 411/388, 389, 455, 458, 459, 460, 473, 474, 475, 356, 357, 358, 446

[56] References Cited

U.S. PATENT DOCUMENTS

| | | | |
|---|---|---|---|
| 71,909 | 12/1867 | Pierce | 411/389 |
| 554,908 | 2/1896 | Brunes | 411/458 |
| 612,407 | 10/1898 | Deakyne | 411/358 |
| 761,375 | 5/1904 | Hanson . | |
| 1,297,523 | 3/1919 | With | 411/466 |
| 1,297,611 | 3/1919 | Upson | 411/459 |
| 1,548,194 | 8/1925 | Fox | 411/358 |
| 1,648,431 | 11/1927 | Warmoth et al. . | |
| 1,777,926 | 10/1930 | Lillard | 52/584.1 |
| 1,784,843 | 12/1930 | Losch | 411/460 |
| 1,870,011 | 8/1932 | Johnson . | |
| 2,065,525 | 12/1936 | Hamilton | 411/460 |
| 2,230,392 | 2/1941 | Storms | 411/460 X |
| 2,620,705 | 12/1952 | Podvinecz et al. | 411/460 |
| 3,473,281 | 10/1969 | Omholt . | |
| 4,028,858 | 6/1977 | Rehbein . | |
| 4,620,403 | 11/1986 | Field | 52/715 X |
| 4,779,393 | 10/1988 | Jong | 52/715 |
| 4,930,280 | 6/1990 | Abendroth . | |
| 5,006,006 | 4/1991 | Lehtonen | 52/712 X |
| 5,027,573 | 7/1991 | Cummins et al. . | |
| 5,339,581 | 8/1994 | Schlickenmeyer . | |
| 5,412,915 | 5/1995 | Johnson . | |
| 5,433,043 | 7/1995 | Hibbitt et al. | 52/27 |

FOREIGN PATENT DOCUMENTS

| | | | |
|---|---|---|---|
| 450392 | 8/1948 | Canada | 411/458 |
| 439105 | 6/1912 | France | 411/458 |
| 1392574 | 2/1965 | France | 411/458 |
| 801181 | 12/1950 | Germany | 411/458 |

*Primary Examiner*—Carl A. Friedman
*Assistant Examiner*—Laura A. Callo
*Attorney, Agent, or Firm*—Keith S. Bergman

[57] ABSTRACT

An invisible decking connector for wood decking structures fastens elongate decking boards to each other in side-to-side adjacency and fastens the decking boards to underlying perpendicularly oriented joists for positional maintenance thereon. The connector provides a medial disk having axially aligned ribbed nails extending perpendicularly from the medial portions of each of its sides. The periphery of the disk defines a slot to receive the head of a fastening screw extending in angulated orientation through an adjacent decking board and into a joist therebeneath. A tool with a body defining a medial hole to receive one of the ribbed nails to aid installation of the fastener by use of a hammer is disclosed.

3 Claims, 1 Drawing Sheet

U.S. Patent      Dec. 1, 1998      5,842,319
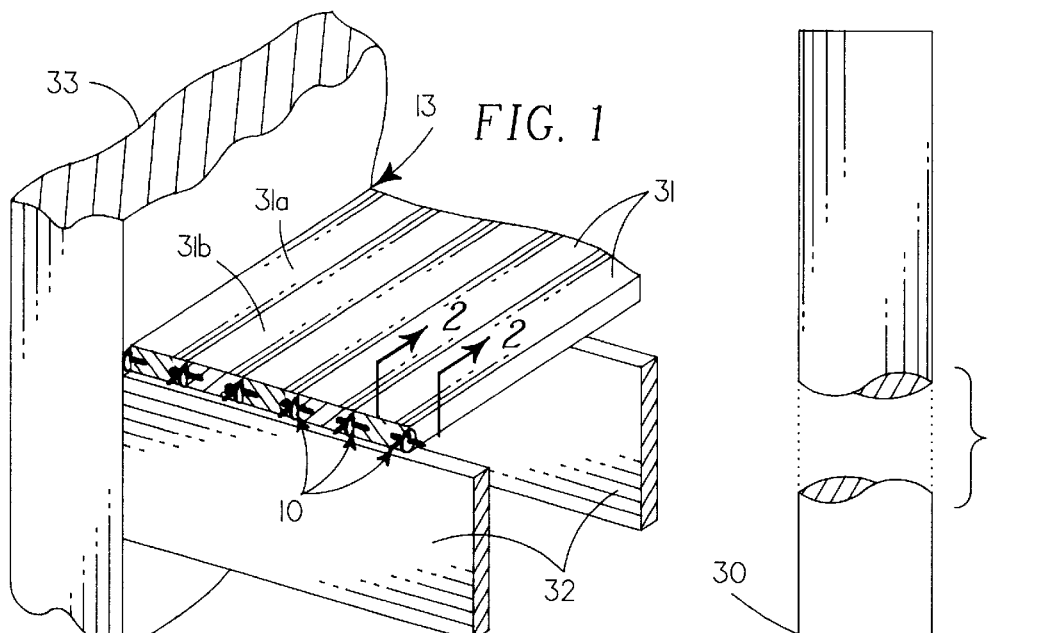
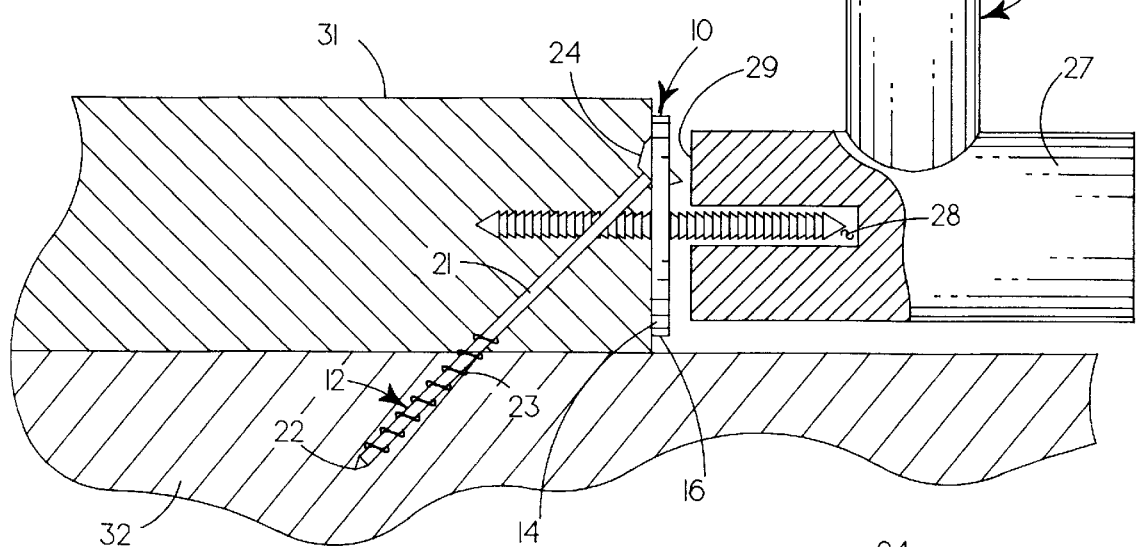
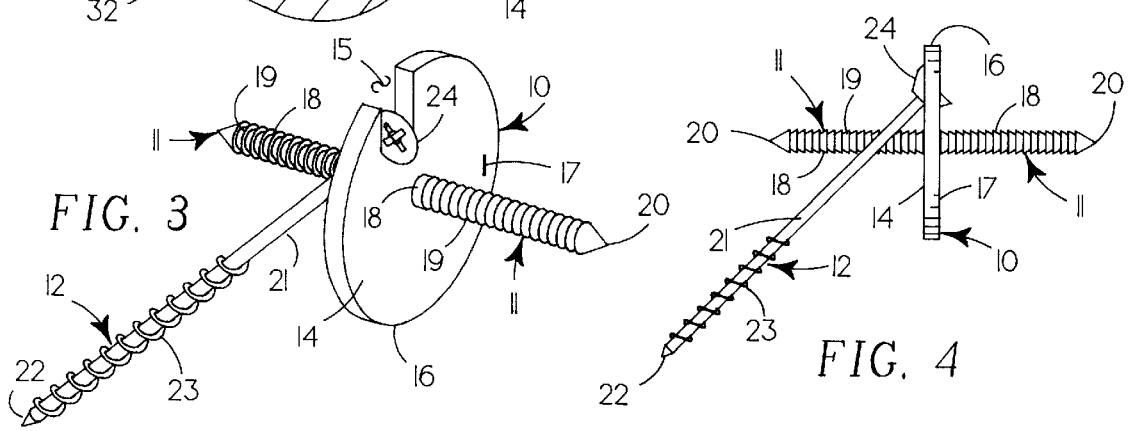

INVISIBLE DECKING CONNECTOR

BACKGROUND OF INVENTION

A. Related Applications

There are no applications related hereto heretofore filed in this or any foreign country.

B. Field of Invention

This invention relates generally to the invisible fastening of decking boards on joists, and more particularly to a disk connector having two axially aligned fasteners extending into two adjacent decking boards and a third fastener extending in angulated orientation through the disk and one decking board into an underlying joist.

C. Background and Description of Prior Art

In light frame construction it is often desirable to provide a blind or invisible interconnection of decking boards to each other and to underlying supporting joists. This desire is accentuated with decking which is exposed to an outdoor environment as such decking tends to be modified over a period of time by oxidation, leaching and similar environmental factors to make exposed connectors more visible and to create discolorations in deck structure thereabout. This problem has been recognized and various solutions have heretofore been proposed to resolve it. Though such solutions have had some history during which they have become increasingly sophisticated, problems still remain with the blind fastening of decking. The instant invention seeks to resolve various of the remaining problems.

Decking systems usually are established on joists with decking boards in spaced adjacency to allow space for expansion and contraction of the system, and especially the decking boards, without damage. Decking fasteners provide a means by which this spacing may be well and readily accomplished and prior invisible fastening systems for decking have provided means for such decking board spacings. The instant fastening system allows variation of this spacing by adjusting the thickness of the body disk of the fastener or addition of washer-like spacers between adjacent decking boards.

Various known invisible decking fastening systems have been used to fasten decking boards to each other or to fasten decking boards to underlying joists and not to each other. Known fastening systems that have fastened individual decking boards to both adjacent decking boards and underlying joists have not provided secured fastening in both directions. Various fastening devices of the latter type have provided elements that extend between adjacent surfaces of decking and supporting joists which prevent these adjacent surfaces from being in immediate supportive contact throughout all potential contact areas, to create an assembled structure that may not have much durability, may allow fastened elements to move relative to each other during normal use and may cause fasteners to partially release from their initial fastening position and mode. The instant connector in contradistinction provides no structures covering adjacent surfaces between decking boards and supporting joists so that the fastening system has a maximum of vertical stability and provides little cover of adjacent surfaces between decking boards which is not of a deleterious nature.

As the history of fastening decking boards on underlying joists has developed, fasteners have progressed from simplistic straight-sided nails of round or rectilinear cross-section to quite sophisticated drivable fasteners defining various surface protuberances and indentations. The purpose of these fasteners is to attempt to maintain them in their original fastened position after action by environmental factors, principal among which are changes of moisture, temperature and physical forces between the adjacent connected surfaces caused by irregular forces upon the interconnected structure. In the more recent history of such fasteners screws that are established by turning rather than by driving have become more popular, especially after development of effective power tools for inserting such screws. The instant connector in distinguishment from the prior art provides interconnected ribbed nails extending between adjacent surfaces of interconnected decking and an elongate screw carried by the connector body to extend in angulated orientation through one decking board and into fastenable interconnection with a joist therebeneath.

Since my connector provides drivable nails extending in opposite directions from both sides of a disk shaped body, the first nail to be inserted in a decking board cannot be effectively established by direct driving. I provide a tool having a body defining a channel to receive one nail of the connector to allow driving of the other opposed nail either by direct impact of the tool on the body of the fastener or preferably by impact of a hammer upon the tool.

My invention lies not in any one of these features individually, but rather in the synergistic combination of all of the structures of my fastener, tool and system that provide the functions necessarily flowing therefrom.

SUMMARY OF INVENTION

My fastener provides a disk-like body supporting similar elongate fasteners extending perpendicularly from the medial portion of each body side. The body defines a fastening slot extending radially inwardly from the periphery to receive and support the head of an angulated fastener established therein. The connector is used by driving a horizontal fastener into the medial portion of an elongate vertical side of a decking board in a position vertically above a joist supporting it until the body of the fastener is adjacent the vertical surface of the decking board. An angulated fastener is then established in the peripheral slot and screwed through the adjacent decking board and into a supporting joist therebeneath. A second decking board then is placed in position adjacent the first decking board and driven against the outwardly projecting horizontal fastener until the second decking board is moved adjacent the fastener body. The process is continued throughout the decking structure, normally with a fastener at each junction of a decking board and underlying joist.

A particular tool having a head with a cavity to accept one horizontal fastener is disclosed to aid in driving the opposed horizontal fastener into a decking board.

In providing such a decking connector and fastening system, it is:

A principal object to provide an invisible fastening system for decking boards on underlying supporting joists that fastens each decking board to the adjacent decking board and also fastens one side of each decking board to the underlying joist.

It is a further object to provide such a connector that has a disk-like body carried between the vertical surfaces of two adjacent decking boards with horizontal fasteners extending into each adjacent board and provides an orifice to receive and positionally maintain the head of an angulated fastener extending through one decking board and into a joist therebeneath so that all three fasteners of a connector are positionally maintained relative to each other by the body.

A still further object is to provide a tool to aid the driving of one horizontal fastener into the vertical surface of a decking board.

A still further object is to provide such a connector that is of new and novel design, of rugged and durable nature, of simple and economic manufacture and otherwise well adapted for the uses and purposes for which it is intended.

Other and further objects of my invention will appear from the following specification and accompanying drawings which form a part hereof. In carrying out the objects of the invention, however, it is to be remembered that its accidental features are susceptible of change in design and structural arrangement, with only one preferred and practical embodiment being illustrated and specified as is required.

BRIEF DESCRIPTION OF DRAWINGS

In the accompanying drawings which form a part hereof and wherein numbers of reference refer to similar parts throughout:

FIG. 1 is a partial isometric view of a portion of a decking structure in which my connector is used for fastening.

FIG. 2 is an enlarged partial vertical cross-sectional view, taken on a line such as 2—2 on FIG. 1 in the direction indicated by the arrows thereon, with a partially cut-away orthographic view of my tool to aid driving of the first horizontal fastener.

FIG. 3 is an enlarged isometric view of my connector showing its various elements, their configuration and relationship.

FIG. 4 is an orthographic elevational view of the fastener of FIG. 3 in operative position.

DESCRIPTION OF PREFERRED EMBODIMENT

My invention generally provides a connector having body 10, horizontal fasteners 11 and angular fastener 12 to interconnect decking boards with each other and with underlying supporting joists.

Body 10 provides relatively thin disk 14, in the instance illustrated with perpendicular faces 17 of circular peripheral configuration. The disk 14 defines angulated fastener slot 15 extending spacedly inwardly from the disk periphery 16 to receive and support the head of an angulated fastener. The peripheral shape of disk 14 is not critical to my connector and though a disk of circular cross-section is illustrated, disks of other cross-sectional shapes, either linear or curvilinear, will fulfill the purposes of the connector. The maximum peripheral size of disk 14 in a vertical direction is critical and must be less than the thickness or vertical dimension of decking boards to be joined by the connector so that the disk 14 will not project either above or below those decking boards when established between adjacent vertical surfaces of the boards. Most exterior exposed decks of light frame construction are formed of planed boards having a nominal thickness of 1.675 inch and the maximum vertical dimension of disk 14 is therefore limited in such decking structures to a maximum vertical dimension of somewhat less than one and five-eighths inch. The disk 14 may have a greater horizontal dimension if desired, but in general there is little purpose for this.

The disk faces 17 are generally planar and parallel to each other. The thickness of the disk, that is its dimension perpendicularly between faces, is not critical and may vary depending upon the spacing desired between decking boards to allow expansion and contraction of a decking structure embodying my connectors resulting from environmental factors. The purpose of the disk 14 is to interconnect the connector fastening devices, space decking boards appropriately and provide means to aid insertion of a horizontal fastener in the decking board. So long as these purposes are fulfilled, minimum peripheral dimensions of the disk and its thickness may vary within the limits set forth.

Horizontal fasteners 11 comprise similar nails 18 carried by disk 14 to extend outwardly from the medial portion of each face, in the instance illustrated in perpendicular axial alignment. The nails 18 define ribbed peripheral cylindrical surface 19 to aid positional maintenance after being driven into a decking board and sharp point 20 defined in their ends distal from disk 14 to aid insertion by driving into a decking board. The nails 18 are structurally interconnected to disk 14 by unitary formation therewith, by welding or by similar interconnection that provides a strong permanent joinder of the elements. The diametrical size of these nails and their length is not critical, but should be such as to provide appropriate strength and rigidity for the interconnected structures and allow placement by driving without splitting interconnected decking boards. The nature of the external surface of the nails is not critical, but preferably should be such as to aid positional maintenance of the nails in a decking board, but even straight sided nails are operative with my connector and all such nails are within the ambit and scope of my invention.

Angulated fastener 12 in the instance illustrated is an elongate screw having body 21 defining point 22 at one end with screw threads 23 extending spacedly inwardly from the point toward head 24 defining slot 15 to interconnect a tool to turn the screw for insertion. Only a portion of the screw body 21 adjacent the point is threaded to reduce friction upon and insertion of the screw in a wood member without breaking or damaging the screw structure. The screw must have sufficient length to extend in angular orientation, when its head 24 is carried in angulated fastener slot 15 of the disk 14, through an adjacent decking board and into fastenable connection with a joist therebeneath. With decking boards of nominal two inch and actual one and five-eighths inch thickness, this normally requires a screw with a length of about two and one-half inches or more. The head 24 of the screw must be such as to fit within the radially inner portion of angulated fastener slot 15, in immediate adjacency with the portion of the disk defining that slot, and prevent passage of the screw head through the fastener slot. Preferably the largest diameter of the screw head will be somewhat greater than the width of the angulated fastener slot.

It is possible that the angulated fastener 12 may be a nail-type fastener that is placed by driving, but a screw fastener is preferred because of its greater fastening strength and ease of placement in angulated orientation. Nail-type angulated fasteners, however, are within the ambit and scope of my connector.

Preferably my connector is formed from steel to provide maximum strength and rigidity with minimal mass, though other materials having appropriate strength, rigidity and durability are within the ambit and scope of my invention. If steel is use as a material formation, it preferably is galvanized or otherwise coated or treated with some material that aids in preventing oxidation and other chemical changes in the connector material that would cause staining or discoloration in wood, even though normally if such staining or discoloration occurs it will be below the surface of decking interconnected by my connectors. Other materials that have appropriate strength and rigidity may be used and are within the ambit and scope of my invention.

The insertion of a horizontal fastener 11 into an adjacent decking board must be accomplished by the exertion of some force thereon, commonly an impact type force or a sustained pressure-type force. The application of an impact force to the connector may be difficult without the use of a tool adapted for that purpose, since horizontal fasteners extend on both sides of the relatively small disk 14 to make application of an impact force by direct blow of a hammer difficult if in fact possible.

A particular tool 26 to aid insertion of the first horizontal fastener to be inserted into the edge of a decking board is shown in the illustration of FIG. 2 where it is seen to comprise elongate head 27 defining medial channel 28 extending spacedly inwardly from one end 29 of the head. The channel 28 is of incrementally larger diameter and greater length than the horizontal fastener 11 to be carried therein so that the tool may be placed over one horizontal fastener with end 29 immediately adjacent the surface of disk 14. A hammer impact delivered to the opposite end of the head will be transmitted to the disk 14 and consequently to the horizontal fastener on the other side of the disk for driving of that horizontal fastener. Commonly the tool head 27 will be provided with an elongate handle 30 which aids in holding and manipulating the device. This type of tool is not new or novel, per se, and similar tools have heretofore been used for similar purposes.

Having thusly described the structure of my connector, its operation may be understood.

A decking structure 13 in which my connector is used is shown in the illustration of FIG. 1 where it is seen to provide horizontal decking boards 31 supported in spaced edge-to-edge adjacency upon plural spaced, perpendicularly extending joists 32, in turn supported by a vertical structural element such as wall 33. Commonly in light frame construction the decking boards 31 and joists 32 are nominal two inch wood boards having an actual thickness of approximately one and five-eighths inches, with the joists having nominal widths ranging from six to twelve inches and the decking boards usually having nominal widths ranging from four to ten inches. Where such decking is established in outdoor areas, usually some space must be allowed between decking boards to allow for expansion and contraction of the decking boards and other structural elements as caused by normal environmental factors, and especially temperature and moisture. If decking boards are established without space between their adjacent surfaces, commonly their expansion and contraction may disrupt both their structural and configurational integrity and that of associated structural elements over the course of time.

To create such a decking system with my connectors, a plurality of connectors are established in structural element 33 spacedly above each joist and at a level such that the connectors will be substantially in a medial position on the vertical surface of decking boards to be carried on the joists. The fasteners are driven into the vertical structural element in such position by hammer impacts aided by the tool 26, sequentially associated with each connector.

First decking board 31a then is laid upon the joists, normally with a length and in such position that both ends of the decking board terminate in the medial portion of a joist, and the decking board is driven against the horizontal fasteners projecting outwardly from vertical structural element 33. This motion of the decking board is preferably accomplished by use of an associated board that may be positioned on the outward edge of decking board 31a to receive the impact of a hammer while protecting the edge of the decking board from any disfiguration by reason of hammer impact.

A plurality of connectors then are established in the then outer vertical surface of the first decking board 31a with angulated fastening slots uppermost in a medial position above each joist and at an elevation such that the horizontal fasteners are substantially in the medial vertical portion of the decking board. The horizontal fasteners are driven into the decking board 31a in this position by hammer impact upon the tool 26 positioned over the outwardly extending horizontal fastener of each connector. A second decking board 31b then, preferably having a length different than the first decking board but again preferably extending between the medial portions of two joists, is positioned on the joists outwardly adjacent the decking board 31a. The second decking board 31a is moved by hammer impact on an abutting board into a position immediately outwardly adjacent the disk 14 of connectors carried by the first decking board 31a. When the second decking board 31b is so positioned along its entire course, angulated fasteners 12 are inserted in each angulated fastener slot 15 of each connector disk 14 and oriented in an appropriate angulated direction to pass through the outer edge portion of second decking board 31b and into the joist therebeneath as illustrated in FIG. 2. The angulated fasteners 12 are inserted in this position by driving or turning as appropriate until they are in their fastened position with heads 24 fastenably carried in the lower portion of angulated fastening slots 15. Additional outwardly adjacent decking boards are then established in the same fashion to complete the entire decking surface.

In establishing decking in this fashion, it is to be noted that a first row of decking boards must generally be established over the entire length of a deck before a second row is established, as if boards of a second row overlap a space where boards of a first row require placement, the placement of the first row of boards is not possible. Though it commonly is desirable in placing decking boards to have the ends of those boards joined over a supporting joist this is not necessary and it is within the scope of my invention to join the ends of decking boards at positions other than over a joist, even if such joinder is not so secure nor configurationally sustaining. The ends of decking boards that meet over a single joist may be joined by one connector in the end portion of either outwardly adjacent decking board, but preferably the ends are joined by two connectors spacedly adjacent in the ends of both outwardly adjacent boards, with the angulated fasteners of each connector angled somewhat toward each other so that each interconnects with the underlying joist structure. It is also possible that if the ends of decking boards are interconnected other than over a joint that the ends of the boards may have mortise type interconnections or metallic connecting brackets of some type to provide greater strength and configurational maintenance, but such type of interconnection is more difficult and time consuming than joining those boards over a joist and may require the use of fasteners that are not visibly concealed.

It is to be particularly noted with use of my decking connectors that each connector has both horizontal fasteners and the angulated fastener positionally related relative to each other after establishment in a decking system, and that each intersection of two adjacent decking boards with a joist has fasteners interconnecting each adjacent decking board and an angulated fastener interconnecting the outer portion of each decking board with the underlying supporting joist.

It is further to be noted that the tool 26 might be directly used to cause impact upon a connector to drive the horizontal fastener into an adjacent decking board, though it has been found more practical to use impact of a hammer upon the tool to accomplish this. If the tool were to be used for direct impact it is somewhat difficult to position its channel about an outwardly extending horizontal fastener of a connector during motion causing impact, though this may be aided by increasing the diametrical size of the channel 28 so that the tool need not be so precisely placed. Larger channels, however, cause pressure on disk 14 further radially outwardly from the horizontal fasteners and may disrupt the connection between the disk and the horizontal fasteners or require a stronger interconnection.

The foregoing description of my invention is necessarily of a detailed nature so that a specific embodiment of it might be set forth as required, but it is to be understood that various modifications of detail, rearrangement, configuration and multiplication of parts might be resorted to without departing from its spirit, essence or scope.

Having thusly described my invention, what I desire to protect by letters patent, and

What I claim is:

1. In combination with a decking system having spacedly adjacent fastenable decking boards supported on perpendicularly extending spaced fastenable joists, an invisible connector comprising:

a flat body having opposed, substantially parallel faces with a medial portion and a dimension in at least one direction parallel to the faces that is less than the vertical dimension of the decking boards, an angulated fastener slot extending a spaced distance inwardly from the periphery of the connector body to carry an angulated fastener, horizontal fasteners of cylindrical configuration with spaced annular ridges carried by the body to extend in axial alignment substantially perpendicularly outwardly from the medial portion of each face and into two adjacent decking boards, and an angulated fastener carried in the angulated fastener slot defined by the flat body to extend in angulated orientation through the adjacent portion of one of the two adjacent decking board to fastenably interconnect with a joist beneath the one decking board.

2. The connector of claim 1 wherein the body has a circular peripheral configuration.

3. The connector of claim 1 wherein the angulated fastener comprises screw having a head too large to pass through the angulated fastener slot.

* * * * *